April 1, 1969  R. W. DODGE ET AL  3,436,067
STACK CUTTING APPARATUS WITH ADJUSTABLE COOLANT MEANS
Original Filed April 28, 1965  Sheet 1 of 7
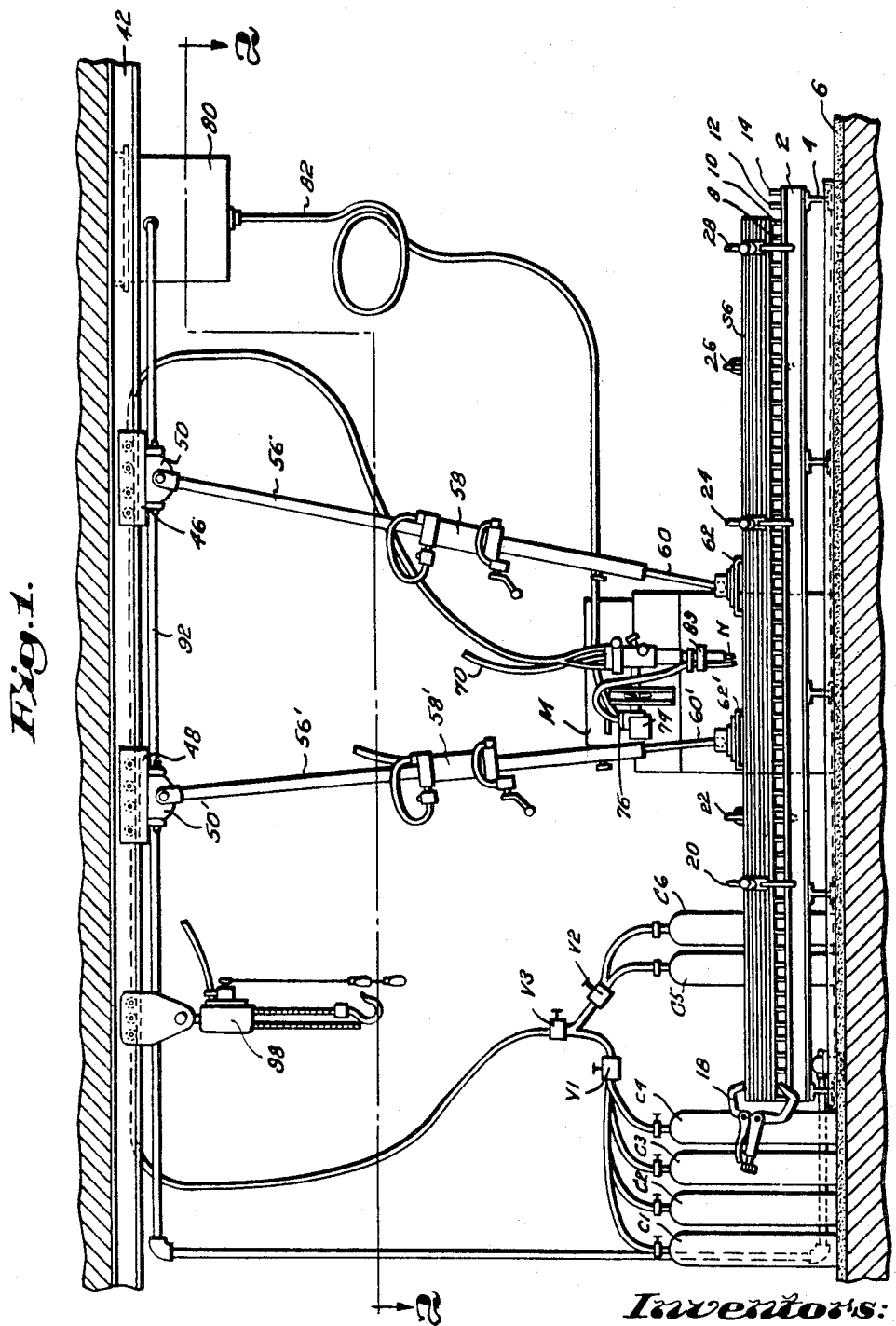
Inventors:
George E. Williams,
Robert W. Dodge,
by Munson W. Hamilton Attorney

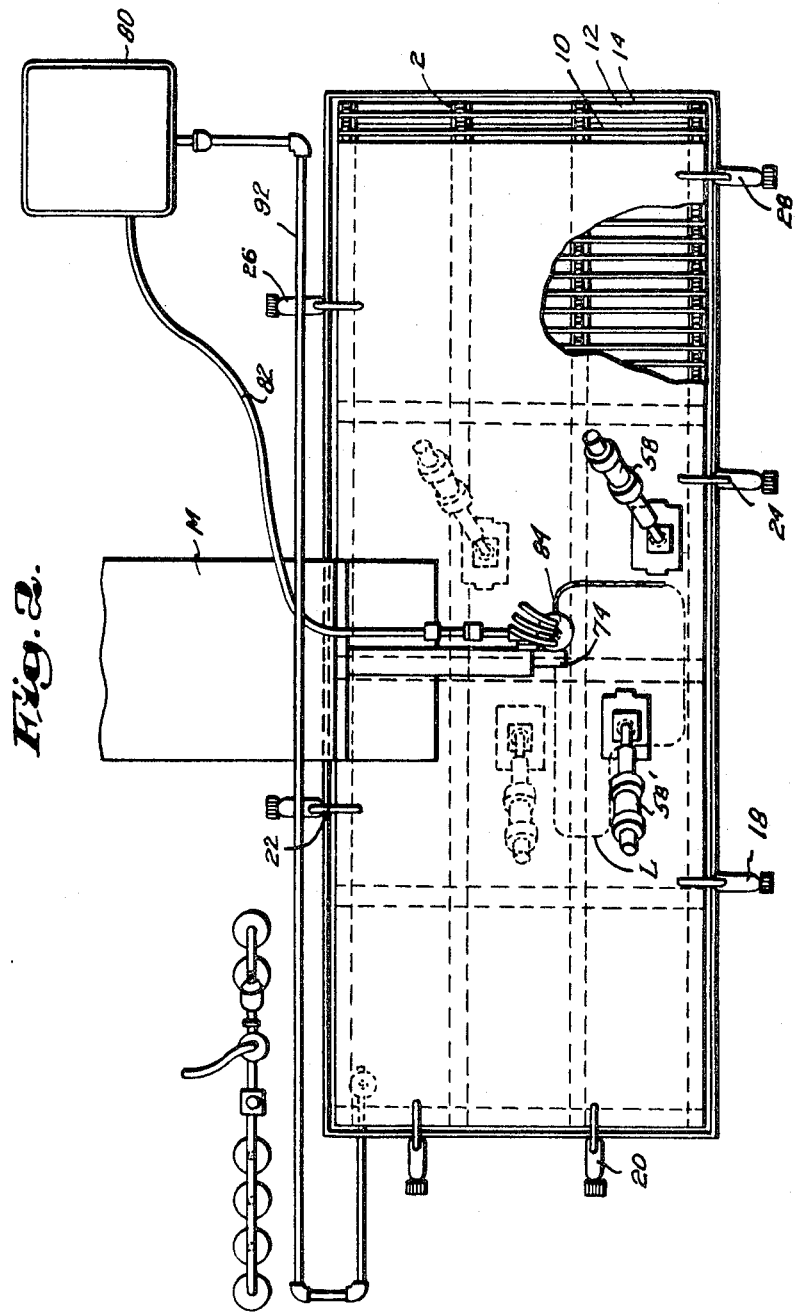

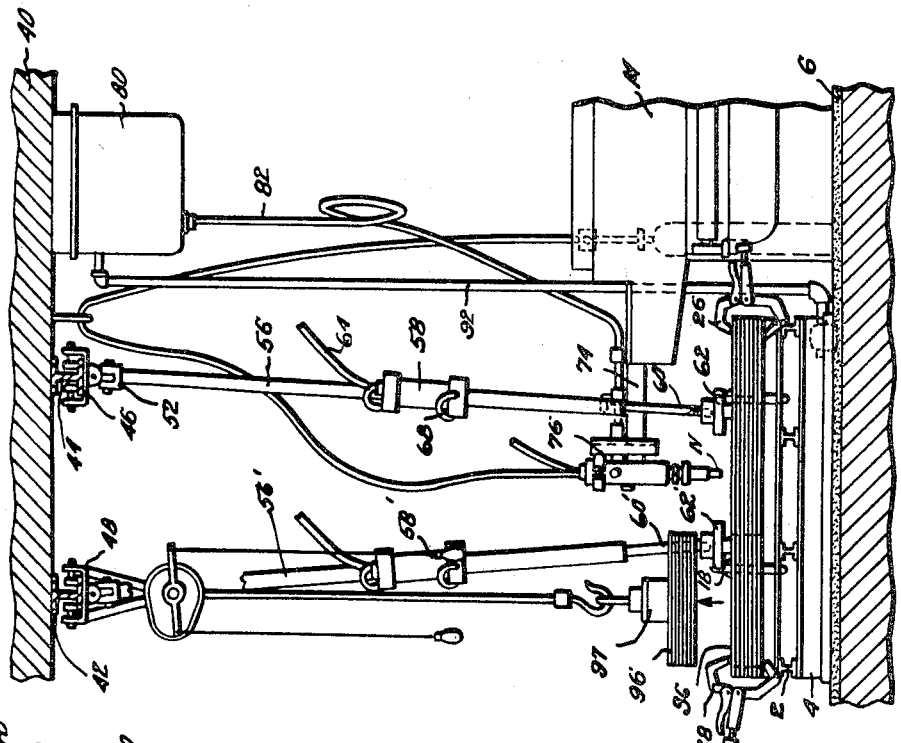

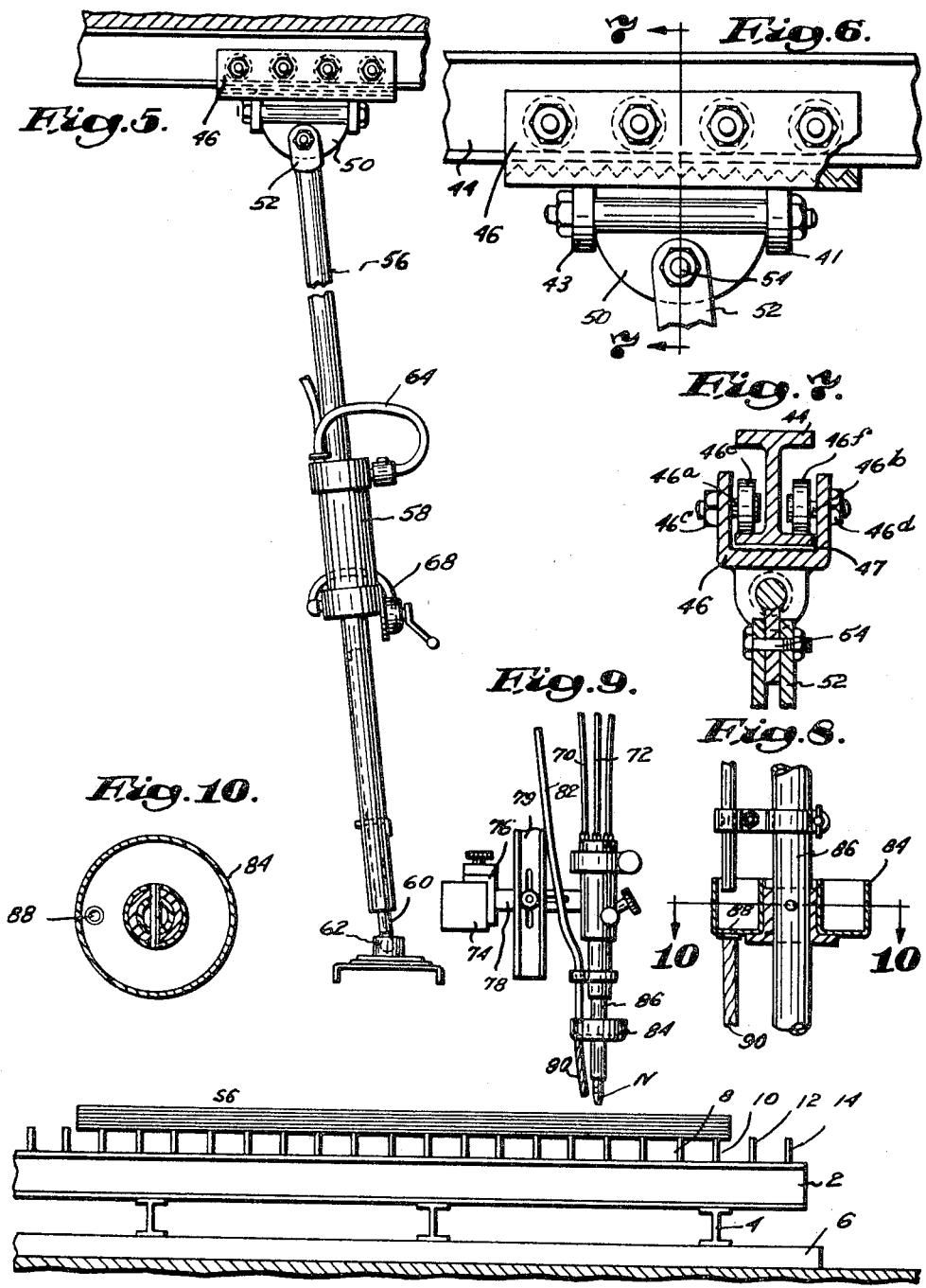

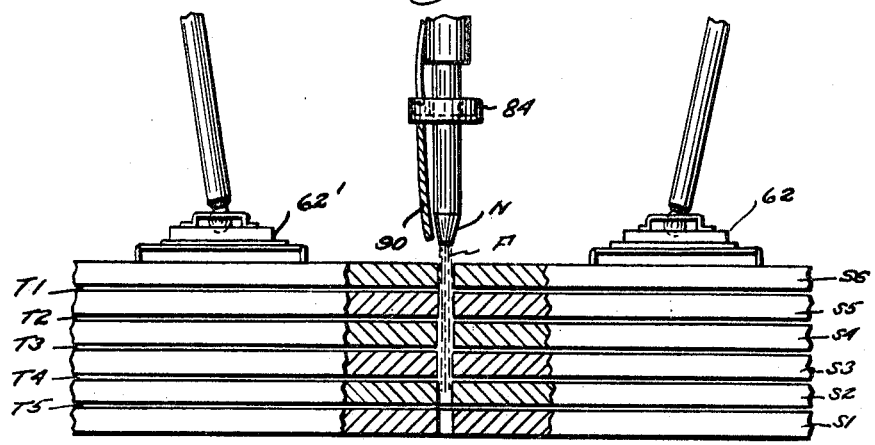
Fig. 13.
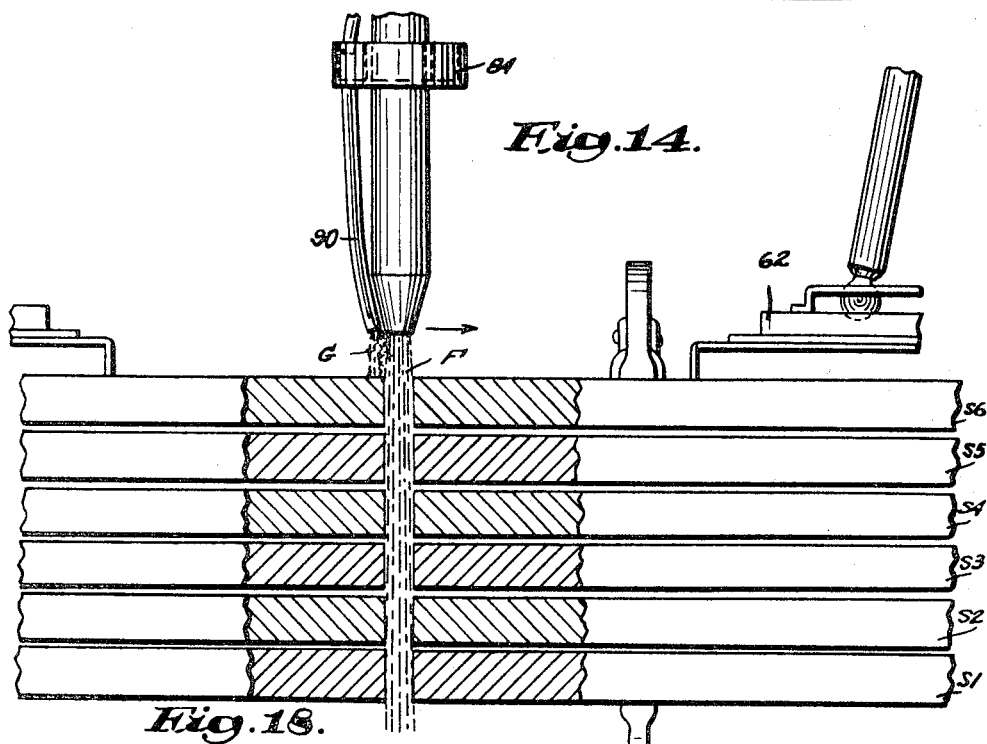
Fig. 14.
Fig. 18.
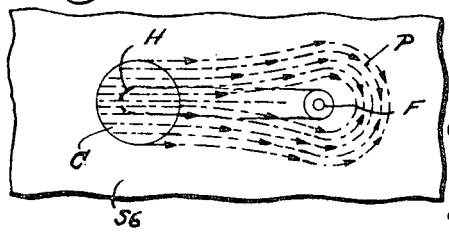
Inventors:
George E. Williams,
Robert W. Dodge,
by Marion H. Hamilton
Attorney April 1, 1969 R. W. DODGE ET AL 3,436,067
STACK CUTTING APPARATUS WITH ADJUSTABLE COOLANT MEANS
Original Filed April 28, 1965
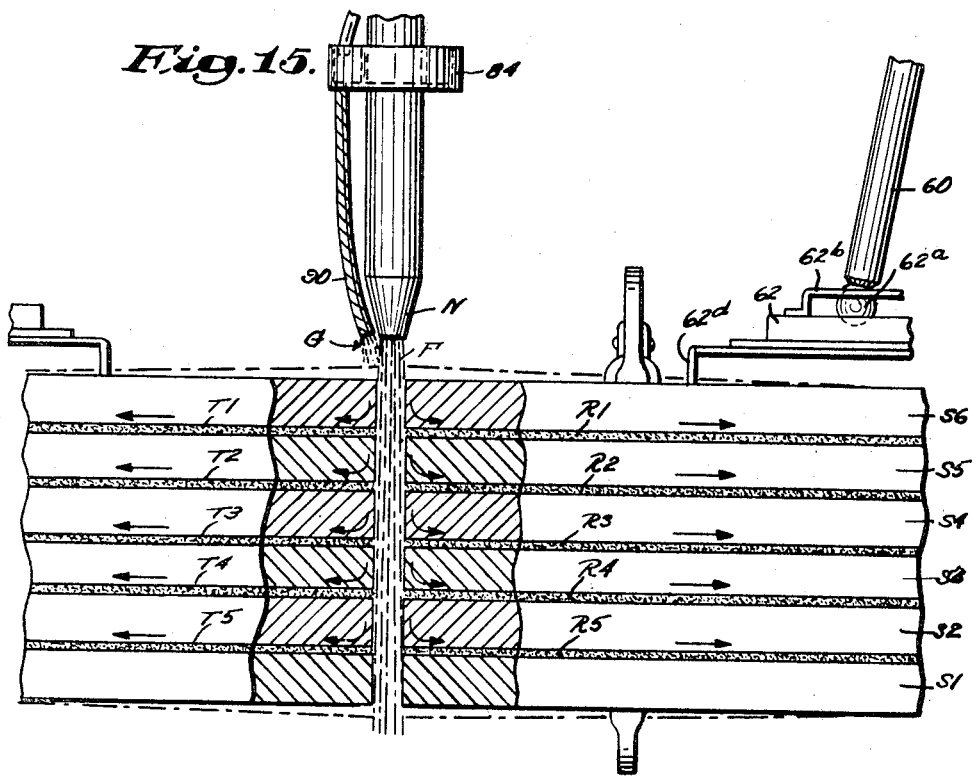
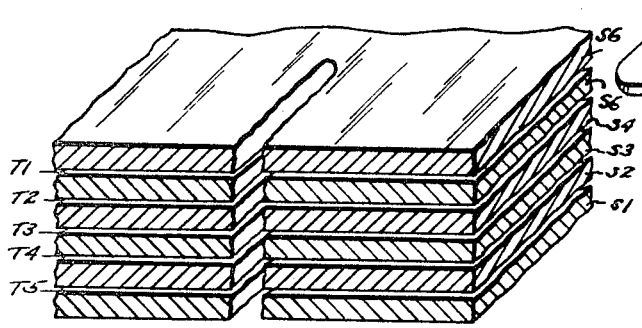
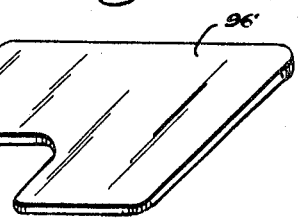
Inventors:
George E. Williams,
Robert W. Dodge,
BY Thomas H. Hamilton
Attorney United States Patent Office 3,436,067
Patented Apr. 1, 1969

3,436,067
STACK CUTTING APPARATUS WITH ADJUSTABLE COOLANT MEANS
Robert W. Dodge, 40 Pleasant St., Wenham, Mass. 01984, and George E. Williams, 463 Elliott St., Beverly, Mass. 01915
Application Apr. 28, 1965, Ser. No. 451,520, now Patent No. 3,338,757, dated Aug. 29, 1967, which is a continuation-in-part of application Ser. No. 390,579, Aug. 19, 1964. Divided and this application Mar. 14, 1967, Ser. No. 630,488
Int. Cl. B26f 1/26, 3/08
U.S. Cl. 266—23                     3 Claims

ABSTRACT OF THE DISCLOSURE

An apparatus for cutting a stack of sheets in which the means for supplying a flow of coolant into the cut includes a reservoir of coolant, conduit means for conveying coolant from the reservoir, and means for adjustably positioning the discharge assembly conduit in relation to the jet flame.

---

This application is a divisonal application of my application Ser. No. 451,520, filed Apr. 28, 1965, now Patent No. 3,338,757 dated Aug. 29, 1967, which, in turn, is a continuation-in-part of my copending application Ser. No. 390,579 filed Aug. 19, 1964, now abandoned, entitled, Method and Apparatus for Stack Cutting with Coolant.

The invention relates to cutting sheets of metal by means of an intense heat source such as, for example, an oxy-fuel flame jet and, more particularly, the invention is concerned with a procedure generally referred to as "stack burning" or "stack cutting" wherein a number of thin metal plates are piled one upon another and simultaneously cut to a desired configuration to produce a number of identically shaped parts in a highly efficient manner. In one typical operation the flame jet may be moved along a predetermined path by means of a shape cutting apparatus of the class well-known in the art. Shape cutting machines of this type are designed to support a flame jet immediately above a stack and to move the jet in accordance with a desired pattern or outline of parts to be cut out.

In utilizing an oxy-fuel flame to cut a steak of steel sheets, a considerable problem arises if the flame is not applied correctly. Thus it is found to be highly essential to continuously maintain the sheets in very close contact with one another. If the sheets are not held sufficiently tightly when subjected to the heat of the flame jet, there may occur spaces or interstices of appreciable size into which the flame jet may become diverted and its energy dissipated. Loss of flame energy in this way can occur quite abruptly and an immediate result is that cutting is interrupted and a great deal of difficulty is experienced in reactivating the cutting procedure.

The problem of maintaining interstice size very small and thereby controlling dissipation of flame energy is rendered more difficult since intense heat from the flame jet tends to radiate outwardly into the sheets causing those portions of the sheets next to the flame to expand more than other parts, thus producing a buckling effect. When this occurs the plates tend to become forced apart slightly to thereby increase the spaces or interstices between the plates.

Buckling is less pronounced when dealing with steel plates of thicknesses greater than ¼-inch since these plates have considerable rigidity. However, for many types of industrial uses there is a need to stack-cut relatively thin steel sheets or plates whose thicknesses may lie in a range of from ¼-inch down to ⅟₁₆-inch and smaller. In this range of thicknesses steel sheets are very much more susceptible to buckling and the use of clamping and welding devices fails to control the buckling. Thus successful stack cutting as a practical matter has not been successfully carried out with steel sheets in the sizes indicated.

It is a chief object of the invention to deal with this particular problem of sheet separation and dissipation of flame energy, and to devise an improved apparatus for cutting a stack of steel sheets or plates and especially those which occur in a range of thicknesses of from ¼-inch down to ⅟₁₆-inch and smaller.

With the foregoing problems in mind, we have conceived an apparatus for controlling thermally induced expansion and preventing appreciable dissipation of heat energy between the stacked plates in sizes occurring either above or below the ¼-inch thickness earlier noted.

In accordance with the invention, we provide a novel apparatus for holding the sheets together in very closely compacted relationship at the points where burning is taking place. We also provide for continuously establishing and maintaing in the spaces between cut edges of the sheets a plurality of barrier coolant films which function to absorb heat and to contain the flame jet in a manner such that a region of concentrated heat flux may be continuously maintained along a relatively narrow line of cutting. In this connection we have found that it is possible to introduce int othe interstices occurring between a stack of metal plates minute barrier films of a coolant such as water, which films serve to fill the interstices and contain the energy of the flame so as to prevent heat flow into the plates sufficient to cause objectionable buckling.

We find that flame cutting of a stack of relatively thin sheets, for example in the ¼-inch–⅟₁₆-inch range, may be suitably accomplished by combining use of selectively applied pressure and application of a stream of coolant in a suitably regulated manner. When a flame cut is started, in accordance with the invention, a stream of coolant such as water is directed against cut edges of the sheets immediately after cutting takes place and simultaneously there are exerted through novel presser foot means relatively large compressive forces which are concentrated on the stack near the line of cutting. From time to time the presser foot means are selectively moved into new positions in accordance with the change in position of the flame jet as cutting progresses in a predetermined path of travel.

We further find that in thus utilizing a stream of coolant and thereby establishing barrier coolant films between the sheets, the compressive forces required may vary in accordance with the sheet thicknesses which are being cut, and we provide means for suitable regulating the pressure employed in relation to the sheets which are being processed.

The nature of the invention and its other objects and novel features will be more fully understood and appreciated in connection with the description of preferred embodiments of the invention shown in the accompanying drawings, in which:

FIGURE 1 is an elevational view partly in cross section illustrating the stack burning apparatus of the invention in one operative position;

FIGURE 2 is a cross section taken approximately on the line 2—2 of FIGURE 1;

FIGURE 3 is a side elevational view partly in cross section further illustrating the stack burning apparatus of the invention in one position;

FIGURE 4 is a view similar to FIGURE 3 illustrating another position of the stack burning apparatus;

FIGURE 5 is a fragmentary detail view illustrating a hydraulic pressurizing device;

FIGURE 6 is a fragmentary detail view of a sliding carriage mechanism;

FIGURE 7 is a cross section taken on the line 7—7 of FIGURE 6;

FIGURE 8 is a detail cross sectional view of a coolant dispensing apparatus;

FIGURE 9 is a view illustrating a drilling operation;

FIGURE 10 is a cross section taken on the line 10—10 of FIGURE 8;

FIGURE 13 is a fragmentary view partly in cross section illustrating a preheating step in starting a cutting operation;

FIGURE 14 is another elevational view partly in cross section of a stack of sheets illustrating the burning operation being started;

FIGURE 15 is a view similar to FIGURES 13 and 14 and further illustrating diagrammatically the formation of barrier films in the interstices between the plates;

FIGURE 16 is a detail perspective view illustrating a plurality of plates with a flame cutting having been formed therein;

FIGURE 17 is a detail view of a flame cut shape of a single sheet of metal; and

FIGURE 18 is a fragmentary detail plan view illustrating area of application of a coolant applied in accordance with the invention.

Figure 11:
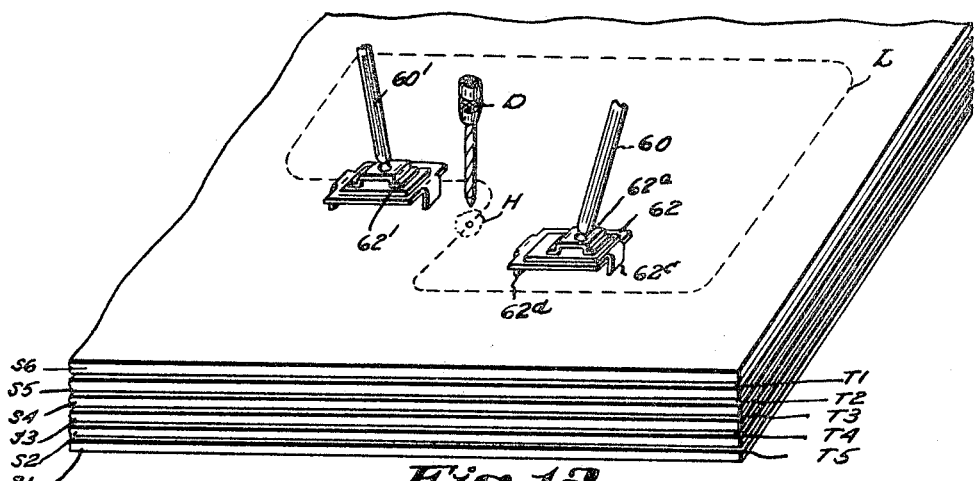
FIGURE 11 is a fragmentary perspective view of a stack of sheets illustrating hydraulic holding means applied thereon.

In one simple form of the invention the application of pressure may be accomplished by using clamps or weights and the application of the coolant may be carried out by manually guiding a stream of coolant from a suitable source through a conduit member. In such an operation the weights may be positioned by an operator and moved along the top of the stack from one position to another as cutting occurs.

However, in carrying out the invention, we provide for moving the stream of coolant in connected relationship with the flame jet. We may also further provide special press means and we may desire to periodically move the press means in relation to the path of travel of the flame as cutting takes place. In this way pressure may be continuously exerted in a concentrated manner at either side or both sides of the cut as it progresses.

As noted above the invention is especially concerned with flame cutting steel sheets or plates in a range of thicknesses of from ¼-inch down to ⅛-inch or less. In addition, it should be appreciated that the dimensions of these sheets may, in some cases, be of an order of magnitude of from 5 to 10 feet square, up to 15 to 20 feet square and larger. It is not intended, however, that the invention be limited to sheets of any particular dimension and the disclosed flame cutting may be practiced with stacked sheets of any size or form to control plate buckling and flame energy dissipation.

The principal parts of the apparatus employed for carrying out the invention in its preferred form includes a raised grid or base for supporting a stack of sheets, an elevated suspension frame located above the base, carriage means slidable in the suspension frame and fluid pressure actuated press means pivotally suspended from the carriage means and movable into contact with the base. Located in close proximity to the base is a conventional shape cutting machine which supports and moves a flame jet cutter member.

An important feature of the invention comprises novel coolant means which is supported above the stack, either on the suspension frame or some other convenient point, and which includes a coolant reservoir and conduit means for conducting coolant therefrom. The conduit means is preferably connected to a stream guiding member which is associated with the flame jet in suitably spaced relation thereto such that the conduit moves with the flame jet as it is travelled along a predetermined path by the shape cutting machine.

Referring more in detail to the structure shown in the drawings, we have illustrated therein a supporting grid which may, for example, be comprised by a plurality of steel I-beam members as 2, 4 arranged in parallel spaced apart position on a cement floor 6 or other fire-resistant base in some convenient manner. Transversely disposed across the I-beam members are a series of spaced bar supports as 8, 10, 12, 14, etc. which may be secured by welding, angle irons, or the like. The bar supports, as well as the I-beams, are of substantial height to locate the upper edges of the bar supports in a raised position in order to provide spaces below into which a flame jet may pass.

As shown in FIGURES 1 to 4 inclusive, the supporting grid comprised by the bars is employed to receive in superimposed relationship thereon a stack of steel plates or sheets S1, S2, S3, S4, S5, S6. These plates are of a relatively flat shape and as furnished by the producer are provided of essentially smooth surfaces. Thus the sheets tend to lie in close contact with one another but nevertheless it should be understood that they do have minute interstices occurring between adjacent surfaces even when forced together by pressure.

The stack of sheets arranged on the support grid, as shown, are secured together and subjected to compressive forces applied at both the outer edges of the sheets and at points immediately adjacent to a required line of cutting. The compressive forces at the edges of the sheets are exerted by the use of clamping devices of various types. In one typical instance in which ¼-inch thick plates 8 x 10 feet in size are to be flame cut in a stack of six such plates as shown in FIGURES 1 to 4 inclusive, compressive forces are exerted by using C clamps as 18, 20, 22, 24, 26 and 28. These clamps are anchored to the grid and secured around the outer edges of the plates in positions as indicated and tightened.

In applying compressive forces at points inside the sheet edges, we further provide for selectively applying compressive forces at intermediate portions of the stack in closely adjacent relationship to the portions which are to be subjected to a flame cutting operation. As illustrative of a shape which may be desired to be cut, we have indicated a broken line configuration L which is shown on the uppermost stack illustrated in FIGURE 11. This same outline is also shown partly cut in FIGURE 2.

The apparatus for selectively applying compressive forces in the manner noted above comprises essentially suspension press means best shown in FIGURES 1, 3 and 4. Numeral 40 denotes an overhead flooring or ceiling located above the concrete flooring 6 and solidly secured to this overhead ceiling are I-beam frame members as 42 and 44 which as indicated in FIGURE 1 extend above and across the surface area of the stack from one side to an opposite stack.

Mounted for rolling engagement on the I-beam members 42 and 44 are suspension carriages as 46 and 48 shown more in detail in FIGURES 5, 6 and 7. The two carriages 46 and 48 are similar in construction. The carriages 46 comprises a channel shaped body through the vertical sides of which are located shaft members 46a and 46b secured by nuts 46c and 46d. On the shafts 46a and 46b are rollers 46e and 46f which run on the I-beam 44.

The bottom of the channel shaped member 46 is grooved at 47 to form a file-like surface so that a braking effect is realized when the suspension member hereinafter described is placed in an angled position and pressure exerted. At the underside of carriage 46 is secured brackets as 41 and 43 through which is pivotally secured a hanger 50. Also pivotally secured to hanger 50 is clevis part 52 secured by a bolt 54. A suspension part 56 extends downwardly from clevis part 52 and supports a fluid pressure actuated cylinder 58 in which is mounted a reciprocating presser foot shaft 60 having a presser foot 62 at the lower extremity thereof. Fluid supply lines 64 and 68 connect cylinder 58 with suitable fluid actuating means such as compressed air or other hydraulic fluid. The carriage 48 supports a similar presser foot arrangement whose parts bear the same but primed numerals as those of the carriage 46.

The presser foot is pivotally attached to the shaft 60 by means of a bar connection 62a received through a top plate 62b. The bottom of the presser foot is formed with spaced apart bearing edges 62c and 62d. By means of this ball joint arrangement a very firm engagement of the presser foot may be realized in a range of angular positions of the member 60 to transfer desired pressure at any point on the stack.

Figure 12:
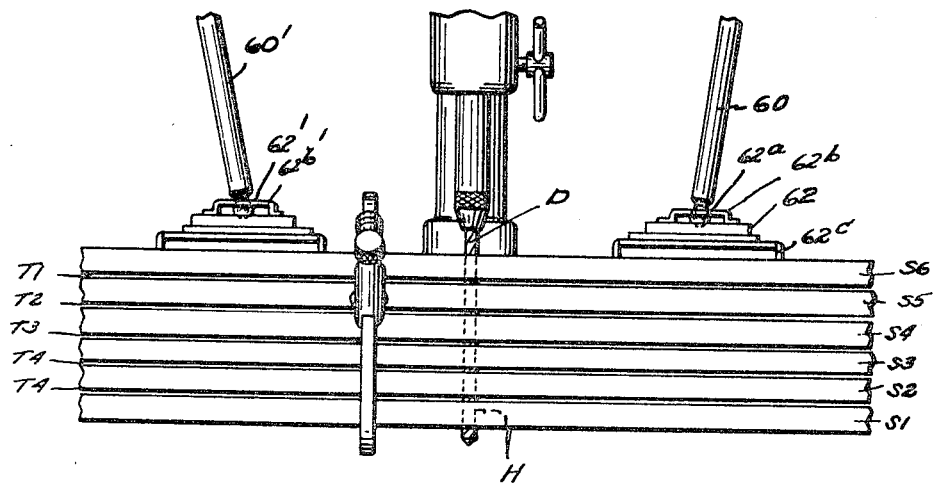
FIGURE 12 is a side elevational view illustrating a drilling operation.

It will be observed that by means of the arrangement of the parts described, a universal jointing is realized and thus the suspension arms 56 and 56′ may be swung about into any desired position of angularity in order to become located in positions at either side of the outline L as is suggested in FIGURES 1 to 4 inclusive and also in FIGURES 11 and 12.

In operating either of these presser foot members, it will be understood that the respective cylinders are first actuated to retract the presser feet. The presser feet may then be readily swung into desired position such as that shown in FIGURES 1, 3, 4 and 11, for example, by an operator who thereafter actuates the cylinders forcing the presser feet into contact with the stack at spaced apart points relative to the design L.

It will be understood that the presser feet may be held in this position while a portion of a cut is being made as hereinafter described. As soon as the cut has progressed to some predetermined point, one of the presser feet members may be released and moved into an advanced position such as is suggested in the dotted line in FIGURE 2 and pressure is again exerted. Thereafter, the second presser foot may be released and moved into a successive holding position and again activated. Thus a constant stepping along of the presser feet may be realized to concentrate application of pressure at desired points relative to the line of cutting L, and at all times one of the members is exerting pressure so that intermediate portions of the stack are constantly held in tightly compressed relationship.

We have found that we may wish to vary the size of the cylinder employed in order to exert greater or smaller pressures depending upon the size of the sheets used, as well as the number. For example, in a stack of six sheets of ⅛-inch thickness, we may employ, with good results, a fluid actuated cylinder of 3-inch diameter size to exert a pressure of from 1200 to 1400 pounds per square inch.

In a stack of six sheets, each of which has a thickness of ¼-inch, we find more pressure must be used and successful burning of these ¼-inch sheets can be accomplished by increasing the size of the fluid actuated cylinder to 6 inches. There is thereby obtained an increase in pressure to a range of pressures of from 2700 pounds per square inch to 3000 pounds per square inch. Other changes of similar nature may be resorted to in regulating pressure exerted in accordance with variation in stacks being cut.

When the sheets have been stacked and clamped and pressurized in the manner indicated they occur with minute interstices T1, T2, T3, T4 and T5 which have been indicated diagrammatically on a somewhat exaggerated scale in FIGURES 11 to 15 inclusive. While in this position the sheets are subjected to a drilling operation to provide a drilled hole at some desired point inside a desired area of cutting which has been suggested by the broken line L in FIGURES 2 and 11. The hole H is suggested in dotted lines in FIGURE 11 wherein a portion of a drill D is shown in a position about to be lowered into a cutting position and it will be understood that the hole H provides a starting position for a flame jet to initiate burning.

In drilling the hole H it is important to provide cut edges which occur perpendicularly and to insure this we may employ a magnetic type drill as the member D as suggested in FIGURES 11 and 12. In the latter figure the drill is shown in a fully advanced position with the presser feet at either side thereof. It is also important to control the size of the hole drilled with reference to the size of the flame jet which is to be employed in cutting. In one typical operation we have found that a hole of approximately ⅜-inch diameter is satisfactory. It will be observed, as shown diagrammatically in FIGURE 12, that the drilled hole communicates with each of the interstices T1, T2, T3, T4 and T5.

As earlier noted flame cutting is achieved by means of a source of intense heat which may be of any suitable type including devices such as a plasma-jet, high frequency electrical heating means, oxy-fuel jets, and the like. As illustrative of one suitable heating means we may employ a flame jet nozzle N which may be of varying types and which is preferably of the conventional oxy-acetylene class into which separate flows of oxygen and acetylene may be supplied. The flame jet nozzle is denoted by the letter N and the flame jet is indicated by the letter F as shown in the figures. In FIGURE 1 we have illustrated diagrammatically oxygen and acetylene being supplied through control valves V1, V2, V3, and then through conduits 70 and 72.

In the preferred arrangement of the flame jet nozzle described, the nozzle N is supported in an upright position on a movable arm 74 projecting horizontally outwardly from one side of a shape cutting machine M of conventional construction and indicated in FIGURES 1 to 4 inclusive. The shape cutting machine is arranged to follow a master outline which is applied to the machine in the well-known manner. As shown in the drawings the tracing machine is preferably located at one side of the stack of plates and the arm 74 is of a length such that it may extend all the way across the stack to locate the nozzle N in any desired position.

Further adjustment of the nozzle N may be provided by holding frame 76 which includes a slotted horizontal bar part 78 and a vertical slotted bar part 79. The nozzle chamber construction may be conventional and the usual control valves are employed.

In carrying out the flame jet cutting technique, we further combine with the flame jet nozzle a coolant supply device which is attached directly to the flame jet nozzle at a point above its lower extremity and we further combine with the coolant supply a stream guiding conduit which extends downwardly out of the coolant supply device into desired positions of adjustment relative to the flame jet itself.

The coolant supply apparatus includes a raised fluid reservoir 80 best shown in FIGURES 1–4. The reservoir provides a gravity feed of a coolant such as water through a conduit 82 to a supply device 84 which, as shown in FIGURE 8, is rotatably mounted about a tubular part 86 of the flame jet nozzle N. This member comprises an annular receptacle into which a controlled volume of coolant is delivered through conduit 82. The bottom of the supply device 84 is formed with an outlet 88 communicating with a stream guiding pipe 90 which is preferably formed of a metal or plastic.

The metal or plastic when bent or turned into a desired shape is designed to hold that shape indefinitely. Thus it will be apparent that as the flame is caused to be moved along a desired path of travel, the supply device 84 may rotate into different positions if necessary and at the same time the member 90 may be bent or otherwise positioned in suitably spaced relationship to the nozzle N as desired. Coolant discharged from member 90 passes downwardly and eventually collects in a container portion of the base from which it is pumped back into the member 80 through a pipe 92. This provides for a constant source of supply of coolant.

In operation, assuming the hole H has been drilled and the flame jet is located over the hole H in a starting position, oxygen and fuel are furnished by the operator to the nozzle N and ignited. The relative quantities supplied are controlled and advanced to provide a flame jet of relatively high heating intensity and relatively low velocity. This type of flame is used to carry out a pre-heating step which is designed to very rapidly raise the temperature of the exposed edges of the sheets in the hole H to a point of fusion.

As soon as the fusion point is reached, as observed by the operator in a matter of a few seconds, the quantity of oxygen is increased relative to the quantity of acetylene supplied and there is then produced a relatively higher velocity cutting flame which is of lower heating intensity but capable of maintaining fusion of the edges so as to provide for a progressive cutting action. Thereafter the nozzle N is moved along the line L by the shape cutting machine M.

An important feature of flame cutting consists in supplying a controlled flow of coolant concurrently with the application of the flame jet. In thus supplying a stream of coolant we provide for establishing and maintaining a plurality of barrier coolant films which function to contain the flame jet in a manner such that a region of concentrated heat flux may be continuously maintained within a relatively narrow area of cutting. In thus establishing and maintaniing barrier coolant films, we supply a stream of coolant fluid as water, for example, at a temperature of from 40° F. to 60° F. The stream of coolant is directed in a highly selective manner into contact with exposed edges at points closely adjacent to but carefully separated from the flame jet F1. In this way we are enabled to introduce coolant into the interstices between the plates as the plates seek to expand with heat, and the thin coolant films tend to become drawn into the interstices and extend outwardly at either side of the cutting flame to exclude peneration and to absorb heat. The stream of coolant G is shown being delivered from a conduit 50 in FIGURES 14 and 15.

Considering the various steps in further detail, FIGURE 13 illustrates the step of pre-heating in which the flame jet F is directed through the hole H and the edges are heated to a fusion temperature.

In FIGURE 14 there is illustrated the steps of initiating the cut by moving the cutting flame jet F in the direction of the arrow and concurrently directing a guided stream of coolant G into the area of cutting. The stream is controlled so that the coolant is caused to flow downwardly around substantially all of the exposed edges which have been cut by the drill, as well as edge portions freshly cut by the flame jet.

We further control the application of coolant by employing a stream whose cross sectional diameter is substantially greater than the width of the cut made by the flame jet as suggested diagrammatically in FIGURE 18. In applying a stream of coolant of this nature we find that it is essential to bring the coolant stream into very close proximity to the flame jet and a flow of coolant is caused to take place along either side of the cut and also forwardly around the flame jet as suggested in FIGURE 18 by the forward area of travel P indicated by the arrows.

We have also discovered that it is possible to direct the coolant stream almost up to the area of burning of the flame jet without actually extinguishing it although it must be borne in mind that if the flame jet is actually contacted by the stream of coolant, the flame may become partly or wholly extinguished and interruption of the flame cutting will then occur. Thus it will be apparent that it is highly essential to apply and maintain the stream of coolant in a carefully controlled manner so that it is directed against fused metal edges which have just been cut by the flame and before these edges can start to cool and solidify.

With the coolant stream selectively applied as described, we find that significant advantages in the flame cutting action are realized and that relatively thin films of coolant may be drawn into the interstices T1, T2, T3, T4 and T5 between the sheets S1 through S6 to form barrier films R1, R2, R3, R4 and R5 which extend outwardly for a considerable distance on either side of the nozzle N as may be best seen from an inspection of FIGURE 15. The presence of the films of coolant in the interstices is readily observed when the flame cutting operation is completed and the cutout shapes when separated shortly after cutting disclose wet surfaces.

It is pointed out that as the flame advances through metal and constantly tends to raise the temperature of portions of the stacked sheets at those areas immediately surrounding the flame jet, there is a definite tendency for the sheets to expand and move away from one another slightly. It is believed that by holding a continuous stream of coolant in close proximity to the relieved edges when this expansion and relative movement of the sheets takes place, portions of the coolant are subjected to forces which draw the coolant into the interstices and hold the coolant in the form of relatively thin films described.

Whether formed in this way or in some other way, the films are definitely established in the interstices and effectively constitute barrier members completely filling the interstices and excluding any passage of the flame therethrough even though some further expansion of the sheets takes place. This dissipation of flame energy is largely prevented. In addition, there is a constant vaporizing of a part of the coolant in the films taking place at all times, as evidenced by the presence of steam and thus a part of the heat which is directed outwardly through the plates is absorbed and used up with the result that plate expansion or buckling is significantly retarded.

As cutting progresses along the outline L, the member 84 may be turned to coincide with change in positioning of the jet and when desired the spacing of member 90 relative to nozzle N may be regulated. Also, as earlier disclosed, the presser feet are periodically moved from one position to another as becomes necessary.

From the above disclosure it will be apparent that we have provided an improved method of stack cutting wherein buckling may be controlled in small sheet thicknesses by use of a coolant and the application of a stream of coolant is carried out in combination with flame cutting in a novel manner. It will also be seen that novel pressurizing of sheets of any size is provided for by the suspension press means of the invention and as a result savings in time and labor are realized.

Although we have disclosed preferred embodiments of the invention, we may desire to resort to various modifications or changes within the scope of the appended claims.

We claim:

1. An apparatus for cutting a stack of sheets comprising a base for supporting a plurality of sheets in stacked relationship, a suspension frame located above the base, a plurality of fluid pressure actuated press means pivotally suspended from the suspension frame and extensible into contact with the stack to force the sheets against one another, means for selectively manipulating each of the press means, flame jet means including a nozzle for directing the flame, means for supporting the flame jet means and traveling it along a predetermined path of travel to form a cut, a coolant receptacle supported for rotary adjustment about said flame jet means, means for supplying fluid to said coolant receptacle, an adjustable conduit movable with said receptacle for discharging coolant from said receptacle at a predetermined point and in spaced relation to said flame jet means downwardly about the exposed edges cut in the stack of sheets.

2. The structure of claim 1 wherein the means selectively manipulating each of the press means is manually actuated.

3. The structure of claim 1 wherein the coolant receptacle comprises an annular container adjustably supported about the flame jet means and the discharging conduit is formed of bendable material to permit its adjustment with respect to the nozzle.

References Cited

UNITED STATES PATENTS

| 977,046 | 11/1910 | Schnabel | 214—114 |
| 1,775,532 | 9/1930 | Le Boeuf | 158—27.4 |
| 1,882,417 | 10/1932 | Graham | 158—27.4 |
| 2,767,458 | 10/1956 | Meier | 83—461 |
| 3,119,724 | 1/1964 | Campbell | 148—9 |

J. SPENCER OVERHOLSER, *Primary Examiner.*

ROBERT D. BALDWIN, *Assistant Examiner.*

U.S. Cl. X.R.

83—461; 72—294